United States Patent
Kumada et al.

(10) Patent No.: US 6,871,142 B2
(45) Date of Patent: Mar. 22, 2005

(54) NAVIGATION TERMINAL DEVICE AND NAVIGATION METHOD

(75) Inventors: Satoshi Kumada, Meguro (JP); Toshie Shirahama, Meguro (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 33 days.

(21) Appl. No.: 10/132,211

(22) Filed: Apr. 26, 2002

(65) Prior Publication Data

US 2002/0161516 A1 Oct. 31, 2002

(30) Foreign Application Priority Data

Apr. 27, 2001 (JP) ........................................ 2001-133363

(51) Int. Cl.[7] .............................................. G01C 21/00
(52) U.S. Cl. .................... 701/209; 340/990; 340/995.23
(58) Field of Search ................................. 701/209, 200, 701/207, 208, 201; 340/990, 995

(56) References Cited

U.S. PATENT DOCUMENTS

| | | | | |
|---|---|---|---|---|
| 6,148,260 A | * | 11/2000 | Musk et al. ................ | 701/200 |
| 6,333,702 B1 | * | 12/2001 | Hiyokawa et al. ..... | 340/995.21 |
| 6,446,000 B2 | * | 9/2002 | Shimabara ................... | 701/209 |
| 6,459,986 B1 | * | 10/2002 | Boyce et al. ............... | 701/202 |
| 6,498,982 B2 | * | 12/2002 | Bellesfield et al. ......... | 701/202 |

* cited by examiner

Primary Examiner—Marthe Y. Marc-Coleman
(74) Attorney, Agent, or Firm—Sughrue Mion, PLLC

(57) ABSTRACT

A navigation terminal device includes a map information display unit 771 for displaying, on a screen, the map information containing the location information retrieved by a web server 3, a destination display unit for displaying the destination searched from the map information displayed on the display screen by screen scrolling, a route drawing unit 773 for drawing the route connecting a reference point based on the location information retrieved by the web server 3 to the destination so as to be superimposed on the screen with the map information displayed thereon, and a route searching unit 774 for exchanging the display between the reference point and the destination when the destination is displayed but the reference point disappears from the screen, thereby following the route from the reference point to the destination according to the drawn route information. In this configuration, the operability of a terminal device having a small capacity of screen can be improved and the burden for the user can be relaxed.

17 Claims, 4 Drawing Sheets

MOVE

MOVE

SETTING OF DESTINATION

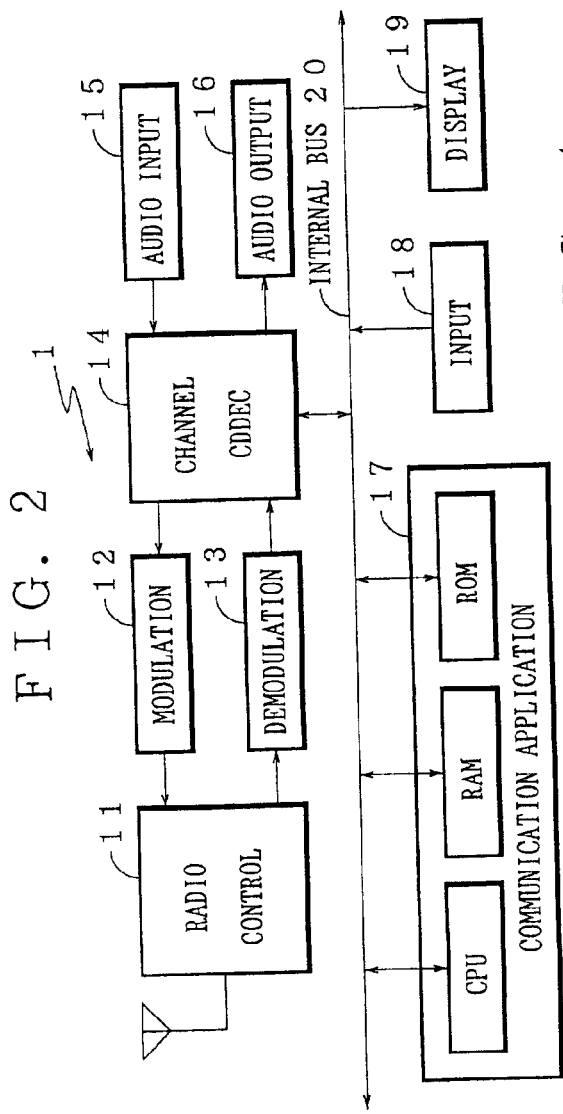
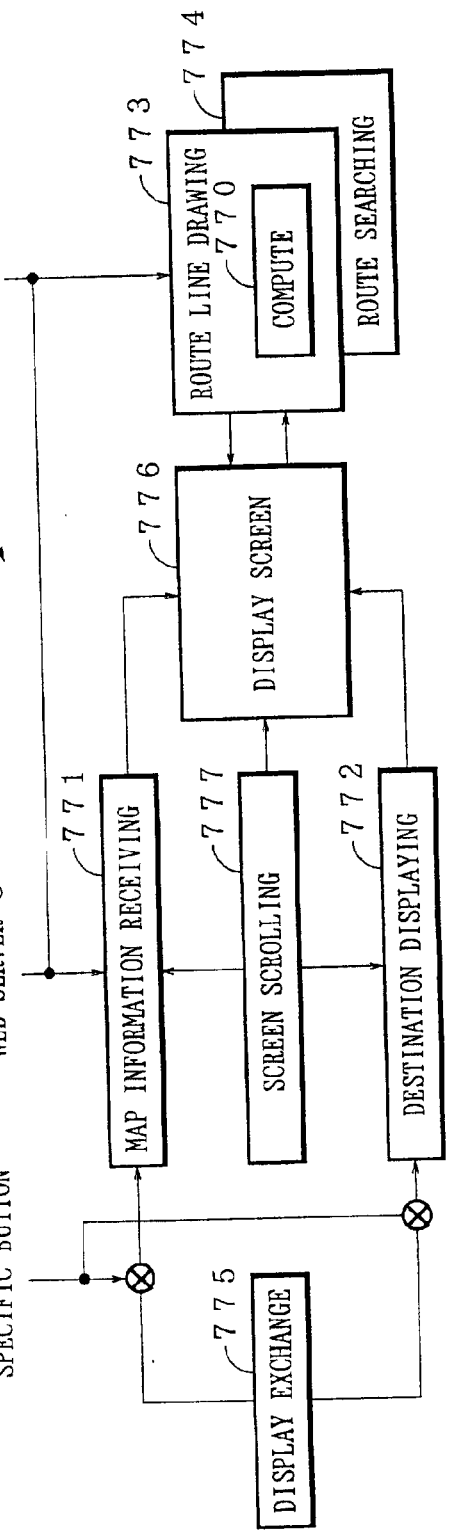

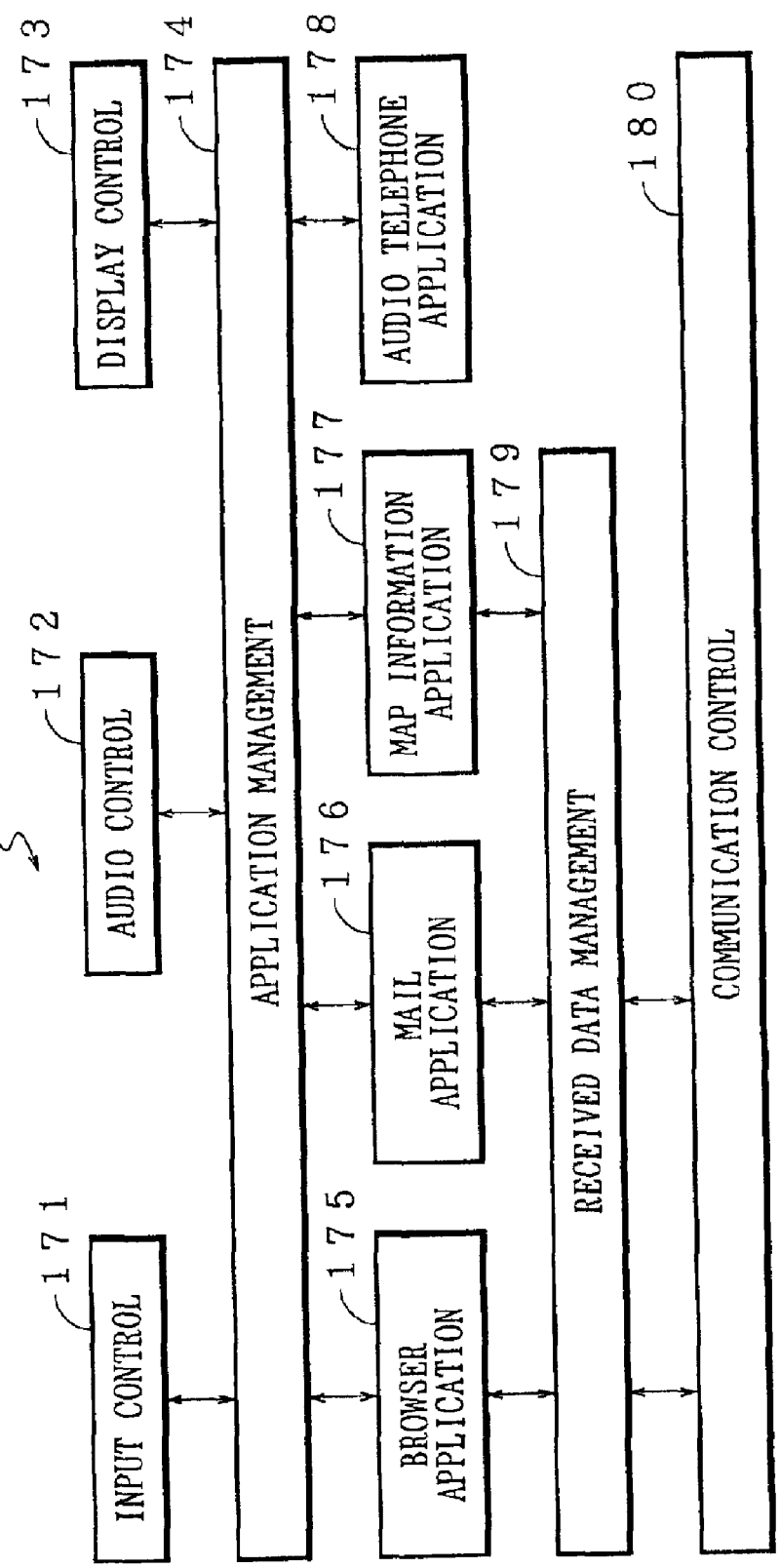

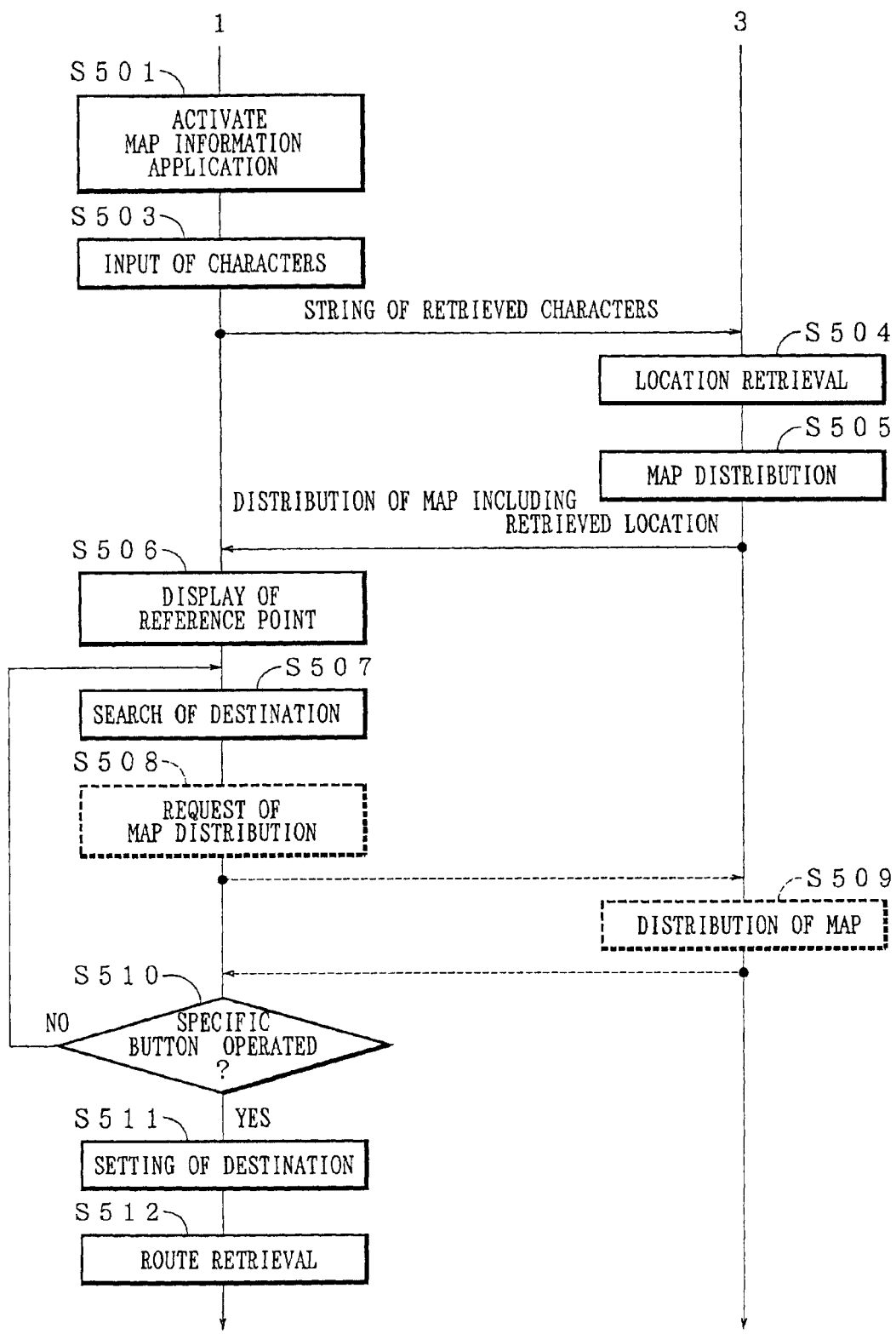

NAVIGATION TERMINAL DEVICE AND NAVIGATION METHOD

BACKGROUND OF THE INVENTION

1. Field of the Invention

This invention relates to a navigation terminal device in which the map information containing location information retrieved by a server is received through a web and displayed on a screen, and a method of navigation.

2. Description of the Related Art

At present, various kinds of items of information are provided on an internet via a WWW (World-Wide-Web) from the world. A user can retrieve desired information by operating a terminal device connected to the web.

One of the various kinds of information services is a map information retrieval service. Through this service, the user can acquire desired map information displayed on a terminal by access to the web server containing a map data base and connected to the internet.

Specifically, when the user inputs an address, a place name, a station name or various kinds of facility and store names, the map of the inputted item and its vicinity is displayed on as image information. Therefore, with reference the map information thus displayed, the user can easily recognize where the designated station, facility, etc. is located.

Meanwhile, as a terminal device for the map information retrieval service using the above web, not only a personal computer equipped with a web connecting configuration such as a browser, but also an in-vehicle navigation system, a PDA (Personal Digital Assistants), portable telephone, etc. are used.

However, in the device having a relatively small capacity of screen such as a portable telephone, it is difficult to understand the information on the outskirts of the designated place map-displayed. This requires very troublesome excessive repetition of scrolling. The excessive repetition of scrolling affects not only the operability but waste the communication fee. Sometimes, an objection is raised by a user. This is burden also the side of the terminal.

Unlike the in-vehicle navigation system, the portable telephone does not have the function of displaying a present location or setting a route. Therefore, the present location or destination can be individually retrieved relatively easily. However, it is not easy to follow the route from the present location to the destination and its reverse. Namely, the portable telephone cannot set the user's own position. Therefore, the facility such as a station searched as a guide is set as a starting point. The destination is retrieved from the starting point by repetitive scrolling. In this case, however, the guide disappears from the screen. Therefore, even if the destination is found, it is difficult to follow the route from the guide to the destination. Therefore, the portable telephone is very poor in the operability. This is remarkable in unknown place.

SUMMARY OF THE INVENTION

Under such a circumstance, this invention has been accomplished.

An object of this invention is to provide a navigation terminal device and navigation method which can improve the operability by retrieving a destination from the map information displayed on a screen and displaying the route from a reference point of the location information retrieved by a server to the retrieved destination by superposition.

In order to attain the above object, there is provided a navigation terminal device characterized by comprising:

map information displaying means for receiving, via a communication line, the map information containing location information retrieved by a server and display the received map information on a screen;

destination display means for searching a destination from the map information displayed on the screen by screen scrolling and displaying it on the screen;

route line drawing means for drawing a route from a reference point of the retrieved location information to the searched destination so as to be superimposed on the screen with the map information displayed thereon.

In a preferred embodiment of the navigation terminal device, the route line drawing means includes a computing means for computing a direction from the reference point to the destination to create a vector having the direction and a length.

In a preferred embodiment of the navigation terminal device, the navigation terminal device further comprises:

a route searching means for exchanging the display between the reference point and the destination if the reference point disappears from the screen when the destination is displayed by the destination display means, thereby permitting to follow the route from the displayed reference point to the destination according to the drawn route information.

In a preferred embodiment of the navigation terminal device, the navigation terminal device further comprises a display exchanging means for exchanging the display between the reference point and the destination by detecting depression of a specific button.

In accordance with the configuration described above, a destination is searched from the map information displayed on a screen by screen scrolling, and the route from a reference point based on the location information retrieved by the web server to the destination is superimposed on the map information on the screen. Where the reference point disappears from the screen when the destination is displayed, the display is exchanged from the destination from the reference point so that a user can follow the route from the displayed reference point to the destination according to the drawn route information.

The route line is drawn in such a manner that the orientation from the reference point to the destination is computed, and the computed result is created as a vector having a length and direction.

In this way, the regional information to the destination can be easily recognized by following the route. The terminal device having a small capacity of screen can do without redundant scrolling so that its operability is improved and the burden for the user is relaxed. The display is switched between the reference point and the destination by operating a specific button so that the operability of the terminal device can be further improved.

In order to attain the above object, there is provided a navigating method for a navigation system including a server for distributing map information and a navigation terminal device for displaying the map information containing location information retrieved by the server on a screen via a communication line, comprising the steps of:

searching a destination from the map information displayed on the screen by screen scrolling; and drawing a route from a reference point of the retrieved location information to the searched destination so as to be superimposed on the screen with the map information displayed thereon.

In a preferred embodiment of the navigation method, the route is drawn by computing a direction from the reference point to the destination to create a vector having the direction and a length.

In a preferred embodiment of the navigation method, when the destination is displayed, if the reference point disappears from the screen, the display is exchanged between the reference point and the destination, thereby permitting to follow the route from the displayed reference point to the destination according to the drawn route.

In a preferred embodiment of the navigation method, the display is exchanged between the reference point and the destination by detecting depression of a specific button.

In order to attain the above object, there is provided a navigation terminal program for a navigation system including a server for distributing map information and a navigation terminal device for displaying the map information containing location information retrieved by the server on a screen via a communication line, comprising:

a first step of searching a destination from the map information displayed on the screen by screen scrolling; and a second step of drawing a route from a reference point of the retrieved location information to the searched destination so as to be superimposed on the screen with the map information displayed thereon.

In a preferred embodiment of the navigation terminal program, the second step includes a step of computing a direction from the reference point to the destination to create a vector having the direction and a length.

In a preferred embodiment of the navigation terminal program, the navigation terminal program further comprises a third step of exchanging the display between the reference point and the destination when the destination is displayed, if the reference point disappears from the screen, and a fourth step of following the route from the displayed reference point to the destination according to the drawn route information.

In a preferred embodiment of the navigation terminal program, the step of exchanging the display between the reference point and the destination by detecting depression of a specific button is executed by a computer.

In order to attain the above object, there is provided a recording medium readable by a computer which stores a navigation terminal program for a navigation system including a server for distributing map information and a navigation terminal device for displaying the map information containing location information retrieved by the server on a screen via a communication line, comprising:

a first step of searching a destination from the map information displayed on the screen by screen scrolling; and a second step of drawing a route from a reference point of the retrieved location information to the searched destination so as to be superimposed on the screen with the map information displayed thereon.

In a preferred embodiment of the recording medium which stores a navigation terminal program, the second step includes a step of computing a direction from the reference point to the destination to create a vector having the direction and a length.

In a preferred embodiment of the recording medium, the recording medium stores a navigation program which causes a computer to execute a third step of exchanging the display between the reference point and the destination when the destination is displayed, if the reference point disappears from the screen, and a fourth step of following the route from the displayed reference point to the destination according to the drawn route information.

In a recording medium of the recording medium, the recording medium stores a navigation terminal program which causes a computer to execute the step of exchanging the display between the reference point and the destination by detecting depression of a specific button is executed by a computer.

The above and other objects and features of this invention will be more apparent from the following description taken in conjunction with the accompanying drawings.

BRIEF DESCRIPTION OF THE DRAWINGS

FIG. 2 is a block diagram showing an internal configuration of a navigation terminal device 1 in FIG. 1;

FIG. 3 is a block diagram showing the internal configuration expanded in function of a communication application unit 37 shown in FIG. 2;

FIG. 4 is a block diagram showing the internal configuration expanded in function of a map information application shown in FIG. 3;

FIG. 5 is an operation sequence for explaining the operation of an embodiment of this invention.

DESCRIPTION OF THE PREFERRED EMBODIMENT

Figure 1:
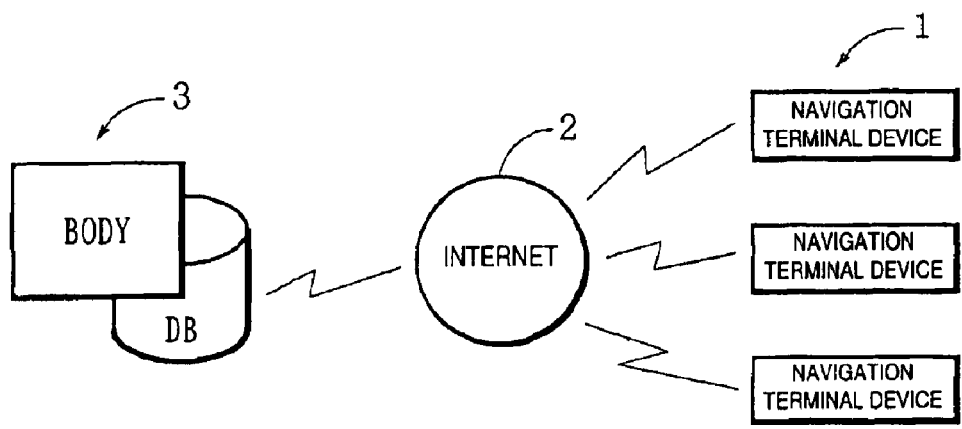
FIG. 1 is a view showing an example of a connecting format to which this invention is applied.

Now referring to the drawings, a detailed explanation will be given of a preferred embodiment of this invention.

FIG. 1 is a view showing the connecting format of a navigation system to which this invention is applied. In FIG. 1, reference numeral 1 denotes individual navigation terminal devices each having a browser function as a client; 2 an internet; and 3 a web server.

Now, a portable telephone having a web connecting configuration is illustrated as the navigation terminal device 1. The portable telephone having a relatively small capacity of screen is connected to the internet 2 though a public switched network or an access service. The internet 2 is connected to a web server 3 which serves as a map information providing site, a map information data base site and a route setting site.

The map information providing site is a site for carrying out the service of providing the map information by WWW. The map information providing site unifies the information supply to the map data base site and the route setting site described later.

The map information providing site includes, as a web server 3, a data base (DB) in which the land marks such as addresses and facilities and their location information. The web server 3 accesses the data base on the basis of the input information from the navigation terminal device 1 so that the address or facility is specified from the input location information and the corresponding location information is acquired from the specified land mark.

The map data base site is a site for carrying out the retrieval/display service of the map information on the internet so that the map data read out is supplied to the navigation terminal device 1. The map data base site includes a map server for supplying map data read out to the navigation terminal device 1 and a map information data base in which location information indicative of the coordinates by latitudes and longitudes, display information of the map such as a reduced scale, map size, etc. and the image data of the map corresponding to these items of information are stored.

FIG. 2 is a block diagram showing the internal configuration of the navigation terminal device 1 in FIG. 1. As described above, as the navigation terminal device 1, the portable telephone provided with the web connecting configuration is illustrated.

The navigation terminal device 1 includes a radio control unit 11, a modulating unit 12, a demodulating unit 13, a channel codec 14, an audio input unit 15, an audio input unit 16, a communication application unit 17, an input unit 18 and a display unit 19. The radio control unit 11, channel codec 14, communication application unit 17, input unit 18 and display unit 19 are commonly connected to an internal bus 20.

The radio control unit 11 serves to transmit modulated data supplied by the modulating unit 12 from an antenna together with a radio carrier wave and receives the signal at a prescribed frequency form the high frequency signals induced at the antenna. The modulating unit 12 serves to modulate the transmission data outputted from the channel codec 14 in a prescribed system (e.g. π/4 shift DPQSK) and supplies the modulated data to the radio control unit 11. The demodulating unit 13 serves to demodulate the signal received by the radio control unit 11 and supplies the signal thus demodulated to the channel codec 14.

The channel codec 14 divisionally supplies the data received from the demodulating unit 13 to the audio output unit 16 or the communication application 17. The channel codec 14 also divisionally supplies the audio received from the audio input unit 15 to the modulating unit 12 or the communication application unit 17. The channel codec 14 also divisionally supplies the data received from the communication application unit 17 to the modulating unit 12 or the audio output unit 16.

The communication application unit 17 includes a CPU, ROM and RAM and serves as a control center for the navigation terminal device 1 which performs not only the connecting control for communication but also control for the creation of the transmission data, display/reserve of the received data and processing of the received/transmitted data. The details thereof will be explained later.

The input unit 18 recognizes the connected key or button to input a dialing number and display image operating data. The display unit 19 displays, on a connected screen display monitor, the data produced from the communication application unit 17 and stored in the display memory not shown.

FIG. 3 is a developed block diagram of the internal configuration of the communication application unit 17 as shown in FIG. 2. Concretely, the communication application unit 17 is constructed of a peripheral LSI such as an input unit 18, display unit 19, etc. inclusive of the CPU, ROM/RAM. The function of each block described later is realized in such a manner that CPU reads the program stored in the ROM and executes it using the RAM.

The communication application unit 17 includes an input control unit 171, an audio control unit 172, a display control unit 173, an application management unit 174, a browser application 175, a male application 176, a map information application 177, an audio telephone application 178, a received data management unit 179 and a communication control unit 180.

The input control unit 171 informs the application management unit 174 of the input key information and others received from the input unit 18. The display control unit 173 performs the control of supplying the display information received from the application management unit 174 to the display unit 19. The audio control unit 172 performs the control of informing the application management unit 174 of the audio received from the audio input unit 15 or supplying the audio received from the application management unit 174 to the channel codec 14.

The application management unit 174 performs the management of selecting one of a plurality of applications prepackaged in the navigation terminal device 1 according to this invention, or exchanging the information between each application and the input control unit 171, display control unit 173, audio control unit 172. It is now assumed that four applications of the browser application 175, male application 176, map information application 177 and audio telephone application 178 have been prepackaged. However, it is needless to say that any other application can be also prepackaged.

The applications to be prepackaged are classified into applications designed for the audio service and for the character service. The former does not carry out the transmission/reception of character data and image data, but supports the audio. The audio telephone application 178 is an example thereof. The latter does not carry out the transmission/reception of the character data and image data such as a map and supports the screen display of each item of information to be transmitted or received. The browser application 175, male application 176 and the map information application 177 are examples thereof.

The internal configuration expanded in function of the map information application 177 is shown in FIG. 4. The map information application 177 includes a map information display unit 771, a destination display unit 772, a route line drawing unit 773, a route searching unit 774, a display exchanging unit 775 and a screen scroll controlling unit 777.

The map information display unit 771 has a function of displaying, on a screen of the display unit 19, the map information containing the location information retrieved by the web server 3 which is received via the internet 2. The destination display unit 772 has a function of displaying the destination searched from the map information displayed on the display screen 776 by the scroll controlling by the scroll controlling unit 777.

The route drawing unit 773 has a function of drawing the route connecting a reference point based on the location information retrieved by the web server 3 to the destination so as to be superimposed on the screen with the map information displayed thereon. The route line drawing unit 773 includes a computing unit 770 for computing a direction from said reference point to the destination to create a vector having the direction and a length. The route is represented by the straight line extended from the center of the map information displayed on the screen to the reference point.

The route drawing unit 773 has a function of computing the direction of the route from the reference point to the destination searched by screen scrolling the updated map information when the peripheral map information is requested again and received, and redrawing the route.

The route searching unit 775 has a function of exchanging the display between the reference point and the destination when the destination is displayed by the destination display unit 772 but the reference point disappears from the screen, thereby following the route from the reference point to the destination according to the drawn route information. The display exchanging unit 775 has a function of exchanging the display between the reference point and the destination by detecting depression of a specific button.

Again referring to FIG. 3, the communication control unit 180 performs the dialing/calling connection and data communication control according to the command from each of the applications 175, 176, 177 and 178. The received data managing unit 179 is located between the communication control unit 180 and each of the browser application 175, male application 176 and map information application 177 to manage the received data to be transferred from the former to the latter.

FIG. 5 is an operation sequence chart for explaining the operation of the navigation system according to this invention in the relationship between the navigation terminal device 1 and the web server 3. FIG. 6 shows an example of screen display.

Now referring to FIGS. 5 and 6, an explanation will be given of the operation of the navigation system according to the embodiment of this invention.

First, a user actuates the map information application by operating the navigation terminal device 1 (step S501). The user designates a prescribed facility, such as a station, department store, convenience store, public facility, etc., which is used as a reference point, or otherwise requests the web server 3 to distribute the map information in a prescribed region by specifying the address, place name or postal number, etc. by character inputting (step S503).

The web server 3 receives the inputted character to retrieve the facility and map data base, and distribute the map information in a reduced scale containing the facility centered thereon to the navigation terminal device 1 (steps S504, S505).

Figure 6A:
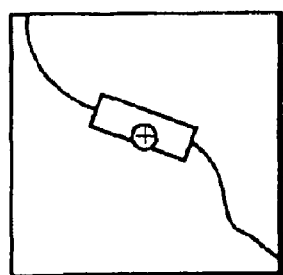
FIGS. 6A to 6D are views each showing a screen configuration of a navigation terminal device for explaining the embodiment of this invention.

The navigation terminal device 1 initiates the map information application 177 already downloaded to display the map information containing the outskirt of the centered facility used as the reference point. FIG. 6A shows an example of the screen display. Now, the station used as the reference point is centered on the screen (step S506).

Next, the user will move toward his destination while carrying the navigation terminal device 1. However, before he moves, he operates the navigation terminal device 1 to search the destination. The searching of the destination is performed by scrolling the screen using the screen scrolling unit 772 (step S507).

Figure 6B:
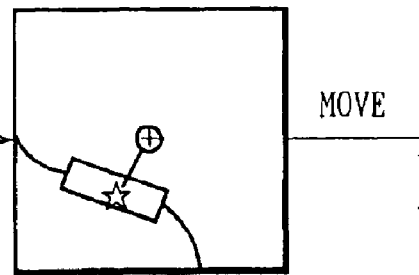

Now it is assumed that when the destination is displayed by the destination display unit, the station which is the previous reference point has disappeared from the screen. FIG. 6B shows the screen display in this case.

Figure 6C:
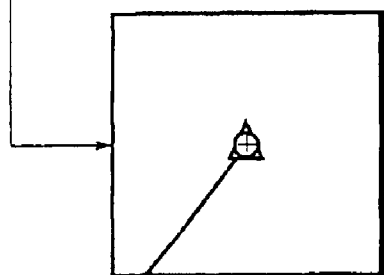

However, the route line represented by the straight line connecting the reference point to the destination is left on the screen of the navigation terminal device 1. This is carried out by the route drawing unit 774. FIG. 6C shows the screen display in this case. The route line drawing unit 774 draws the route connecting a reference point of the location information retrieved by the web server 3 to the destination so as to be superimposed on the screen with the map information displayed thereon.

The route line is drawn in such a manner that the orientation from the reference point to the destination is computed by an operation routine incorporated in the route drawing unit 774, and the computed result is created as a vector having a length and direction. The vector is displayed as a straight line on the screen so that the user can follow the route from the reference to the destination.

Figure 6D:
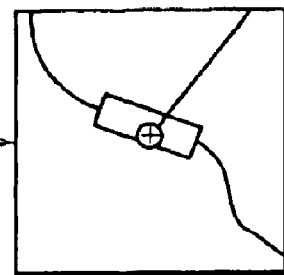

The navigation terminal device according to this invention has a function of holding the reference point and exchange display between the reference point and destination by detecting the fact that a specific button has been operated (steps S510, 511). The exchanging of the display is executed by the display exchanging unit 775. FIG. 6D shows an example of the display screen in this case.

The user can follow the route from the displayed reference point to the destination and its reverse according to the route line information drawn on the screen of the navigation terminal device 1 (step S508). The route line is searched by the route searching unit 776.

During the process from step S506 (display of the reference point) to step 511 (setting of the destination), the navigation terminal device 1 request the web server 3 to distribute the map information of a prescribed region as the occasion demands and receives the distributed map information (both indicated by dotted lines). This is carried out by the map information display unit 771. Where the destination is not included in the map of the outskirt previously received, the navigation terminal device 1 requests the web server 3 to distribute the map information of the neighboring outskirt again.

The destination is searched on the basis of the distributed updated map information by scrolling. The route line drawing unit 773 draws the route from the reference point to the destination on the screen again by computing the orientation from the reference point to the destination. Even when the map information is updated, the route searching unit 774 can follow the route line from the reference point to the destination which has been drawn on the screen by the route line drawing unit 773.

The navigation terminal device 1 receives, from the web server 3, the information of the reference point and destination within a prescribed distance from the displayed center point. The direction from the center point to the reference point or destination and the distance therebetween are computed, and they are created and drawn as segment information. It is now assumed that the length of the segment representative of the orientation is set according to the distance.

In the above embodiment of this invention, the map information was distributed from the web server 3. However, it may be prepared on the side of the navigation terminal device 1. Although the navigation terminal device 1 access the web server 3 to acquire the location information when the destination is set, it may inherently have the location information.

Further, the navigation terminal device 1 should not be limited to the portable telephone adopted in the embodiment. The PDA, home personal computer, in-vehicle navigation device may be used as the navigation terminal device 1. The navigation system according to this invention may be applied to not only the communication network via the internet, but a closed system using the recording medium such as CD-ROM, DVD, etc.

Incidentally, the procedure shown as a sequence chart in FIG. 5 is previously programmed or recorded in the navigation terminal device 1 and the web server 3, and the read program is executed by CPU. However, the program is recorded in the recording medium such as a semiconductor memory, optical disk, hard disk, floppy disk, etc. Further, the program is not fixed on these recording media, but may be downloaded via a communication line.

Incidentally, the contents of Japanese Patent Application No. 2001-133363 filed on Apr. 27, 2001 are hereby incorporated by reference.

What is claimed is:

1. A navigation terminal device comprising:

map information displaying means for receiving, via a communication line, the map information containing location information retrieved by a server and display the received map information on a screen;

destination display means for searching a destination from the map information displayed on the screen by screen scrolling and displaying it on the screen;

route drawing means for drawing a route from a reference point of the retrieved location information to the searched destination so as to be superimposed on the screen with the map information displayed thereon; and route searching means for exchanging the display between the reference point and the destination if the reference point disappears from the screen when the destination is displayed by said destination display means, thereby permitting to follow the route from the displayed reference point to the destination according to the drawn route information.

2. A navigation terminal device according to claim 1, wherein said route drawing means includes a computing means for computing a direction from said reference point to the destination to create a vector having the direction and a length.

3. A navigation terminal device according to claim 1 or 2, further comprising a display exchanging means for exchanging the display between the reference point and the destination by detecting depression of a specific button.

4. A navigating method for a navigation system including a server for distributing map information and a navigation terminal device for displaying the map information containing location information retrieved by the server on a screen via a communication line, comprising the steps of:

searching a destination from the map information displayed on the screen by screen scrolling; and drawing a route from a reference point of the retrieved location information to the searched destination so as to be superimposed on the screen with the map information displayed thereon, wherein, when the destination is displayed, if the reference point disappears from the screen, the display is exchanged between the reference point and the destination, thereby permitting to follow the route from the displayed reference point to the destination according to the drawn route.

5. A navigation method according to claim 4, characterized in that said route is drawn by computing a direction from said reference point to the destination to create a vector having the direction and a length.

6. A navigation method according to claim 4 or 5, wherein the display is exchanged between the reference point and the destination by detecting depression of a specific button.

7. A navigation terminal program for a navigation system including a server for distributing map information and a navigation terminal device for displaying the map information containing location information retrieved by the server on a screen via a communication line, comprising:

a first step of searching a destination from the map information displayed on the screen by screen scrolling;

a second step of drawing a route from a reference point of the retrieved location information to the searched destination so as to be superimposed on the screen with the map information displayed thereon;

a third step of exchanging the display between the reference point and the destination when the destination is displayed, if the reference point disappears from the screen; and a fourth step of following the route from the displayed reference point to the destination according to the drawn route information.

8. A navigation terminal program according to claim 7, wherein said second step includes a step of computing a direction from said reference point to the destination to create a vector having the direction and a length.

9. A navigation method according to claim 7 or 8, wherein the step of exchanging the display between the reference point and the destination by detecting depression of a specific button is executed by a computer.

10. A navigation terminal program according to claim 7, wherein said second step includes a step of computing a direction from said reference point to the destination to create a vector having the direction and a length.

11. A recording medium readable by a computer which stores a navigating terminal program for a navigation system including a server for distributing map information and a navigation terminal device for displaying the map information containing location information retrieved by the server on a screen via a communication line, comprising:

a first step of searching a destination from the map information displayed on the screen by screen scrolling;

a second step of drawing a route from a reference point of the retrieved location information to the searched destination so as to be superimposed on the screen with the map information displayed thereon;

a third step of exchanging the display between the reference point and the destination when the destination is displayed, if the reference point disappears from the screen; and a fourth step of following the route from the displayed reference point to the destination according to the drawn route information.

12. A recording medium according to claim 11, wherein said second step includes a step of computing a direction from said reference point to the destination to create a vector having the direction and a length.

13. A recording medium according to claim 12, characterized in that it stores a navigation terminal program which causes a computer to execute the step of exchanging the display between the reference point and the destination by detecting depression of a specific button is executed by a computer.

14. A navigation terminal device comprising:

map information displaying means for receiving, via a communication line, the map information containing location information retrieved by a server and display the received map information on a screen;

destination display means for searching a destination from the map information displayed on the screen by screen scrolling and displaying the destination on the screen;

route drawing means for drawing a route from a reference point of the retrieved location information to the searched destination so as to be superimposed on the screen with the map information displayed thereon, wherein the route is shown as a straight line between the reference point and the searched destination; and route searching means for exchanging the display on the screen between the reference point and the searched destination if the reference point disappears from the screen when the searched destination is displayed by the screen, thereby permitting to follow the route from the reference point to the searched destination according to the drawn route information.

15. A navigation terminal device comprising:

a display that displays map information;

a controller, which searches a destination from the displayed map information by scrolling and which displays the destination on the display, wherein the controller determines a route from a reference point of the map information to the searched destination and superimposes the route on the displayed map information, wherein the route is shown as a straight line between the reference point and the searched destination, and wherein, when the searched destination is displayed, if the reference point disappears from the display, the display is exchanged between the reference point and the searched destination, thereby permitting to follow the route from the displayed reference point to the searched destination according to the drawn route.

16. A navigation terminal device comprising:

a display that displays map information; and a controller, which searches a destination and which displays the destination on the display, wherein the controller determines a route from a reference point of the map information to the searched destination and superimposes the route on the displayed map information;

wherein the controller changes the display between displaying the reference point and the destination when the reference point disappears from the screen and the destination is displayed.

17. The navigation terminal as claimed in claim 16, wherein the controller searches for the destination by scrolling the map information displayed on the display.

* * * * *